United States Patent [19]

Katsuragi et al.

[11] Patent Number: 4,815,588
[45] Date of Patent: Mar. 28, 1989

[54] ROLLER CONVEYOR

[75] Inventors: Hifumi Katsuragi, Kani; Yoshihiko Fujio; Kazuyoshi Ogita, both of Komaki, all of Japan

[73] Assignee: Daifuku Co., Ltd., Japan

[21] Appl. No.: 109,744

[22] Filed: Oct. 19, 1987

[30] Foreign Application Priority Data

Apr. 23, 1987 [JP] Japan .................... 62-62329[U]
Jul. 1, 1987 [JP] Japan .................... 62-102231[U]
Aug. 3, 1987 [JP] Japan .................... 62-119127[U]

[51] Int. Cl.⁴ .......................................... B65G 13/07
[52] U.S. Cl. .................................. 198/781; 198/782; 198/789
[58] Field of Search ..................... 198/780–791, 198/861.1, 860.3; 193/35 R, 38

[56] References Cited

U.S. PATENT DOCUMENTS

| 4,164,998 | 8/1979 | DeGood et al. | 198/781 |
| 4,172,519 | 10/1979 | Leach | 198/781 |
| 4,461,382 | 7/1984 | Hoover et al. | 198/781 |
| 4,473,149 | 9/1984 | Vogt et al. | 198/781 |
| 4,488,639 | 12/1984 | Vogt et al. | 198/781 X |
| 4,572,358 | 2/1986 | Swain | 198/781 |

Primary Examiner—Robert J. Spar
Assistant Examiner—Lyle Kimms
Attorney, Agent, or Firm—Barnes, Kisselle, Raisch, Choate, Whittemore & Hulbert

[57] ABSTRACT

Free rollers for transferring objects to be transferred, and a driving device for rotating the free rollers are supported by a support frame. A plurality of support frames are attached to a main frame so that their positions can be changed lengthwise of the main frame. The roller pitch can be changed as desired by changing the attaching position of the support frame. Thereby, the number of units each consisting of a free roller and a driving roller is reduced in accordance with the shape and length of objects to be transferred. Thus a cost reduction of the entire conveyor and a compact design of the free roller driving device can be attained.

8 Claims, 15 Drawing Sheets

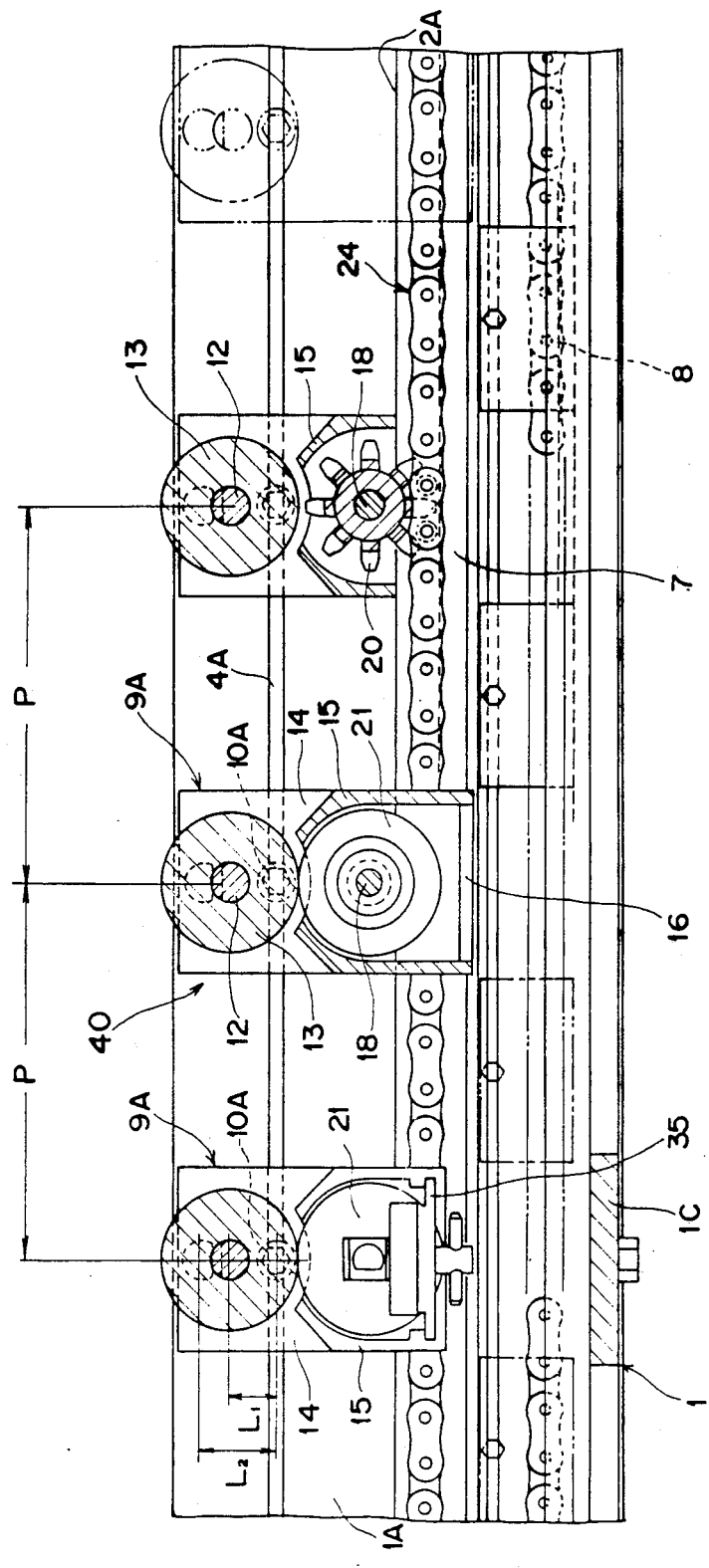

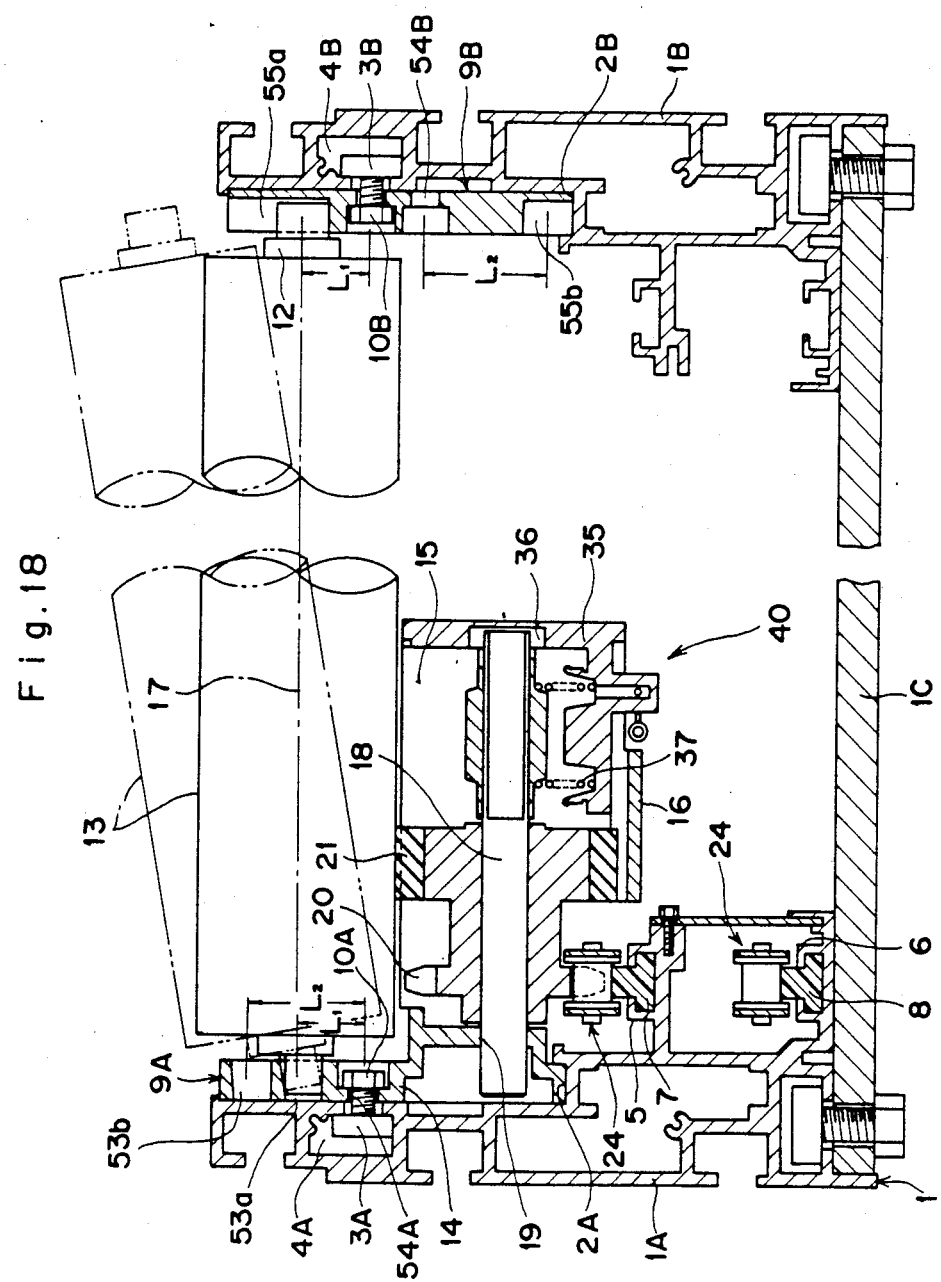

ROLLER CONVEYOR

FIELD OF THE INVENTION

The present invention relates to a roller conveyor which is of a continuous driving type having driving rollers pressed against the outer peripheries of free rollers and yet allows the roller pitch to be changed as desired.

BACKGROUND OF THE INVENTION

This type of roller conveyor is known and is disclosed for example in U.S. Pat. No. 4,488,639. This conventional roller conveyor includes a number of free rollers capable of only free rotation disposed on a main frame to define a transfer path, and a support frame associated with the main frame. The support frame is provided with pins extending parallel to and below the roller axes, each of said pins being provided with a wheel and a sprocket, said wheel and sprocket being rotatable integrally and said wheel being simultaneously contactable with a pair of adjacent free rollers. A driving chain guided along said main frame is engaged with the sprockets.

According to this conventional type, the wheels are rotated by the driving chain through the sprockets, and the rotation of each wheel is transmitted to the pair of free rollers contacted therewith, so that objects to be transferred are transferred on the transfer path by the rotation of the free rollers groups.

According to such conventional type, since the free rollers are stationary with respect to the main frame, the roller pitch cannot be changed according to the shape and length of objects to be tansferred and the conveyor system becomes expensive when the roller pitch is reduced so as to smoothly transfer objects of minimum shape and length. Similarly, since the support frames are stationary, a large number of them are required.

DISCLOSURE OF THE INVENTION

An object of the invention is to provide a roller conveyor which makes it possible to change the roller pitch as desired and also change the position of the driving rollers accordingly.

To achieve this object, a roller conveyor according to the invention comprises:

a main frame, support frame means attached to said main frame so that its position lengthwise of said main frame can be changed as desired, free rollers rotatably attached to the top of said support frame means for transferring objects to be transferred, support shafts disposed in the lower region of said support frame means and extending parallel to and below the axes of said free rollers, said support shafts being vertically swingably attached to said support frame means, a transmission roller and a driven wheel which are supported on each said support shaft and rotatable as a unit, upward movement imparting means attached to said support frame means and operatively connected to said support shafts to move the latter upward, thereby pressing said transmission rollers against the lower regions of the outer periopheries of said free rollers, driving means associated with said main frame and operatively connected to said driven wheels to drive the latter.

According to this arrangement, the transmission rollers are rotated by the driving means through the driven wheels, and in this state, the transmission rollers are moved upward by the upward movement imparting means through the support shafts, whereby the free rollers against which the transmission rollers are pressed are forcibly driven for transferring objects. Further, by changing the attaching position of the support frame means with respect to the main frame, the roller pitch can be changed as desired; thus, the number of units consisting of the free rollers and transmission rollers can be reduced in accordance with the shape and length of objects to thereby save the overall cost and make the driving device compact.

Moreover, since the positions of the units can be changed as desired, when a diverging device or converging device is installed on the side of the main frame somewhere in the conveyor line, the adjustment of the attaching position of such device is facilitated. Since there is no part interposed between adjacent units, i.e., adjacent free rollers, a stopper device for objects to be transferred or a diverging conveyor can be incorporated as desired. Further, since the free rollers and the transmission rollers are unitized by the support frame means, the accuracy of arrangement of these rollers is secured.

BRIEF DESCRIPTION OF THE DRAWINGS

FIG. 17 is a sectional side view of a fourth embodiment of roller conveyor according to the invention;

FIG. 18 is a sectional front view of the roller conveyor show in FIG. 17;

DESCRIPTION OF THE EMBODIMENTS

Figure 1:
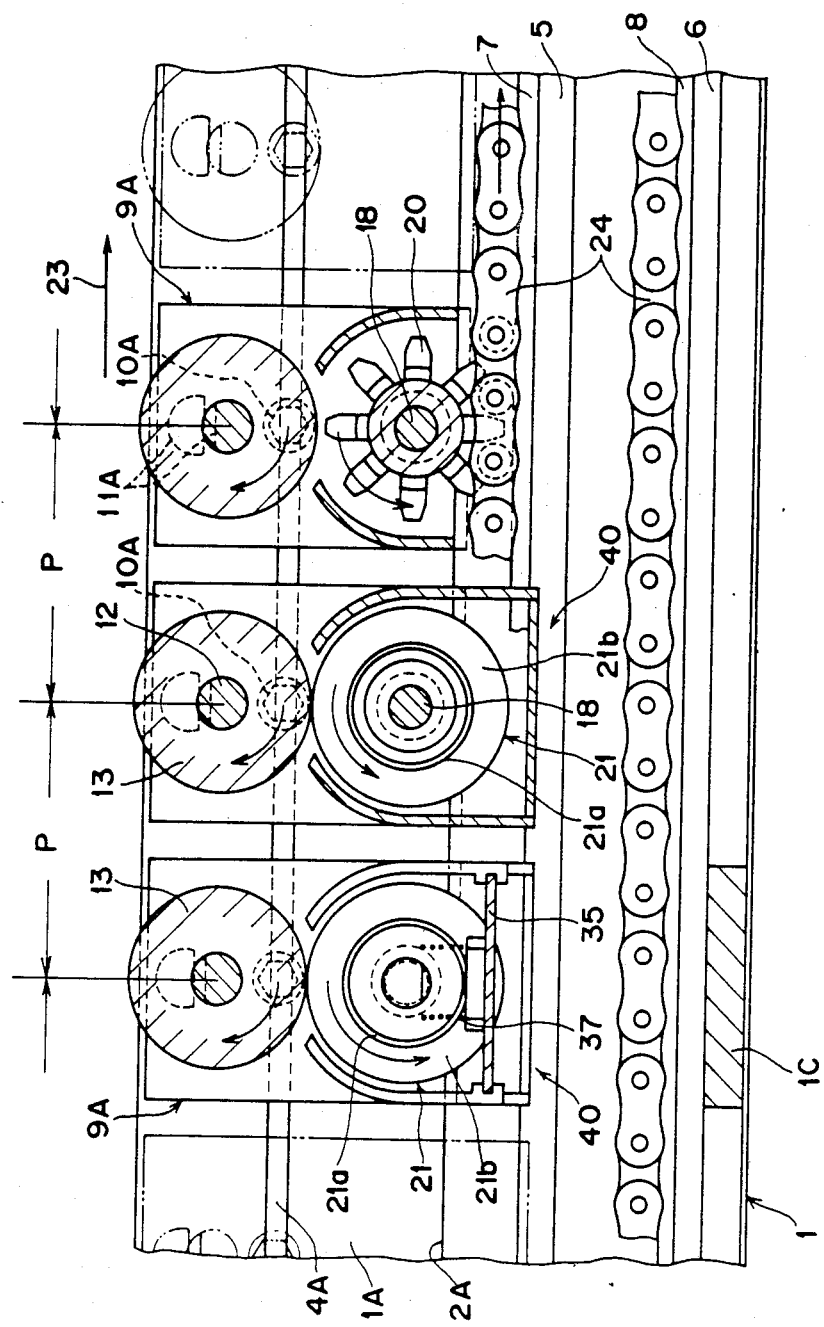
FIG. 1 is a sectional side view of a first embodiment of a roller conveyor according to the present invention.
Figure 2:
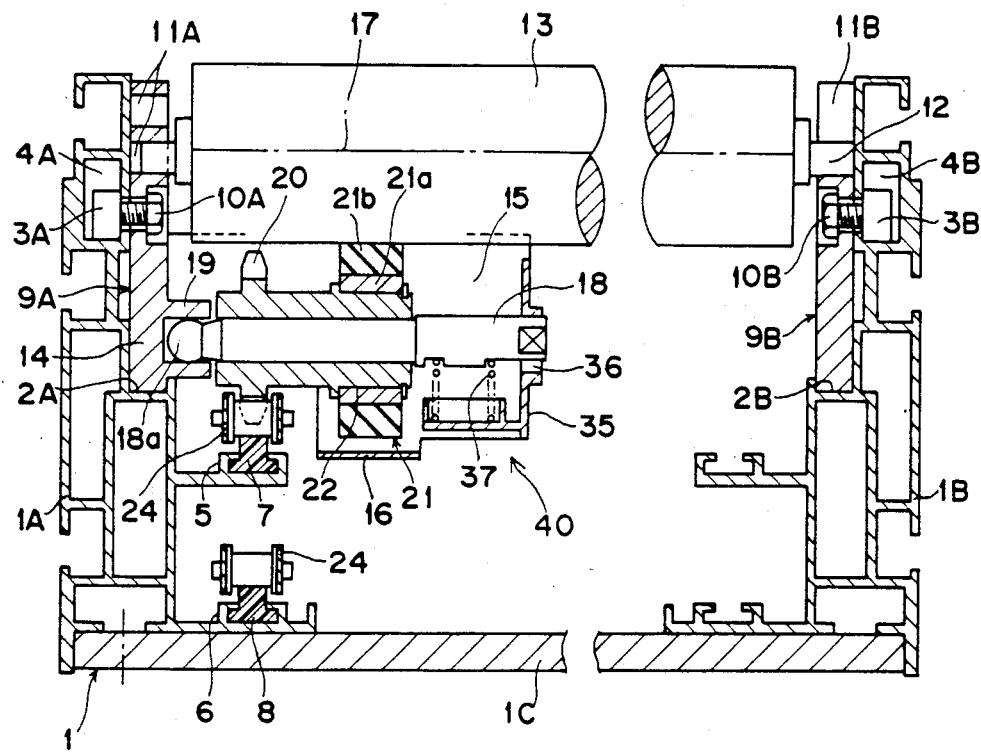
FIG. 2 is a sectional front view of the roller conveyor shown in FIG. 1.
Figure 3:
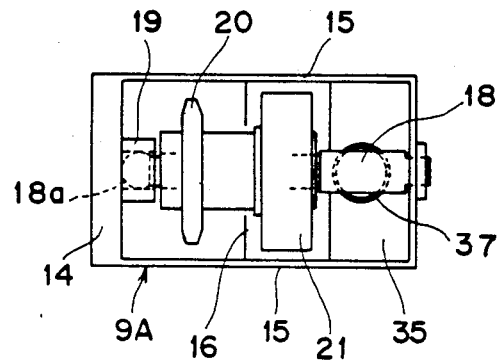
FIG. 3 is a plan view of a portion of the roller conveyor shown in FIG. 2.
Figure 4:
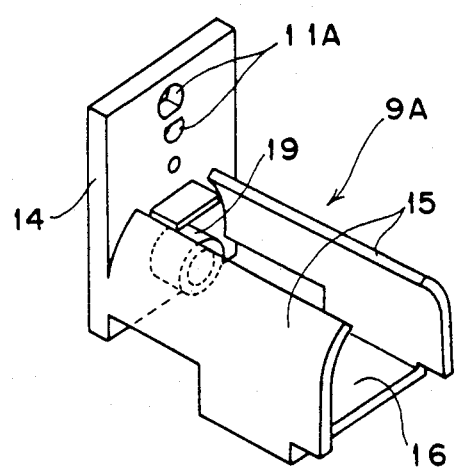
FIG. 4 is a perspective view of a portion of a support frame used in the roller conveyor shown in FIGS. 1 through 3.
Figure 5:
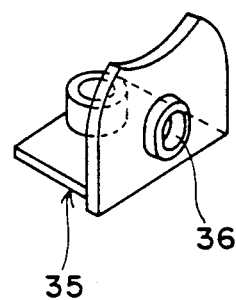
FIG. 5 is a perspective view of another portion of said support frame.

A first embodiment of the invention will now be described with reference to FIGS. 1 through 7.

The numeral 1 denotes a main frame made of metal and having a U-shaped cross-section. Said main frame comprising a pair of lateral frames 1A and 1B and a base frame 1C connecting the lower ends of said lateral frames 1A and 1B. The opposed inner surfaces of the lateral frames 1A an 1B are formed with L-shaped guides 2A and 2B. And the upper regions of the lateral frames 1A and 1B are formed with grooves 4A and 4B which allow the sliding of nuts 3A and 3B. In one lateral frame 1A, the lower inner surface region thereof has a pair of upper and lower guide rails 7 and 8 associated therewith through attachments 5 and 6, said guide rails extending lengthwise of the frame.

The attachments 5 and 6 are integral with the lateral frame 1A. Therefore, the guide rails 7 and 8 can be easily disposed at the predetermined positions. The main frame 1 and the attachments 5 and 6 are integrally formed of aluminum; thus, a frame construction which has sufficient mechanical strength and rigidity can be expected. Despite the fact that the frame construction can be made small in size, heavy objects can be transferred.

The inner surfaces of the lateral frames 1A and 1B are provided with support frames 9A and 9B of resin which are fitted at their lower ends in the L-shaped guides 2A and 2B so that their positions can be changed lengthwise of the frame (they are slidable). These support frames 9A and 9B are fixed in position by passing bolts 10A and 10B through the upper regions thereof and threadedly engaging them with said nuts 3A and 3B so that their positions can be changed. The upper portions of the support frames 9A and 9B are formed with locking portions 11A and 11B. The opposite ends of a roller shaft 12 are locked in said locking portions 11A and 11B, whereby a free roller 13 of resin is freely rotatably installed between the support frames 9A and 9B. One support frame 9A is in the form of a case comprising a base plate 14 formed with the lower end to be fitted in said guide portion 2A and said locking portions 11A, a pair of cover plates 15 extending inwardly from the lower half of the inner surface of the base plate 14, and a connecting plate 16 disposed between the lower ends of the cover plates 15. The other support frame 9B is in the form of a rectangular plate.

Vertically swingably attached to one support frame 9A is a support shaft 18 extending parallel to and below the roller axis 17. That is, the inner surface of the lower end of the base plate 14 is formed with a cylindrical bearing 19, and a ball 18a formed on one end of said support shaft 18 is fitted in said bearing 19, so that the support shaft 18 is vertically swingable around said ball 18a. An L-shaped plate 35 is attached between the lateral ends of the cover plates 15, and the other end of said support shaft 18 is fitted in a vertically extending elongated opening 36 formed in the vertical plate portion of said L-shaped plate 35.

The support shaft 18 has a sprocket 20, which is an example of a driven wheel, rotatably attached thereto.

The boss of the sprocket 20 has a transmission roller 21 fitted thereon. The sprocket 20 and transmission roller 21 are rotatable as a unit. The transmission roller 21 comprises an inner wheel 21a of metal or resin fitted on the boss of the sprocket 20 through a friction transmission section (slip allowing section) 22, and an outer wheel 21b of urethane rubber fitted on said inner wheel 21a, the outer wheel 21b being contacted with the lower region of the outer periphery of the free roller 13. That is, a coil spring 37, which is an example of an upward movement imparting device which effects pressure contact, is interposed between the lower surface of the other end of the support shaft 18 and the bottom plate portion of the L-shaped plate 35. The parts denoted by the reference characters 9A, 9B–22, 35–37 described above form a transmission unit 40, and a number of such transmission units 40 are disposed lengthwise of the main frame 1; thus, a group of free rollers 13 define a transfer path 23. A chain 24 which is a common drive section operatively connected to the sprockets 20 is supported and guided by the guide rails 7 and 8. The chain 24 is installed under tension between a driving sprocket 25 and driven sprockets 26 through guide sprockets 27, said driving sprocket 25 being operatively connected to a motor 29. The numeral 30 denotes objects to be transferred.

Since the attachments 5 and 6 supporting the guide rails 7 and 8 are integral with the main frame 1, as described above, the accuracy of the installation of guide rails 7 and 8 is improved. Thus, the chain 24 can be accurately engaged with the sprockets 20 to provide a satisfactory driving state. Furthermore a frame structure having sufficient mechanical strength and rigidity can be obtained from the constitution, so that heavy objects can be transferred in spite of the small size of the frame.

However, according to the conventional type of U.S. Pat. No. 4,488,639, the guide rails or the attachments supporting the guide rails are not integral with the main frame but held up by the main frame by means of bolts. Therefore, according to this conventional structure, such operational effects of the present invention as above-mentioned can not be expected at all.

The transfer operation will now be described.

Figure 6:
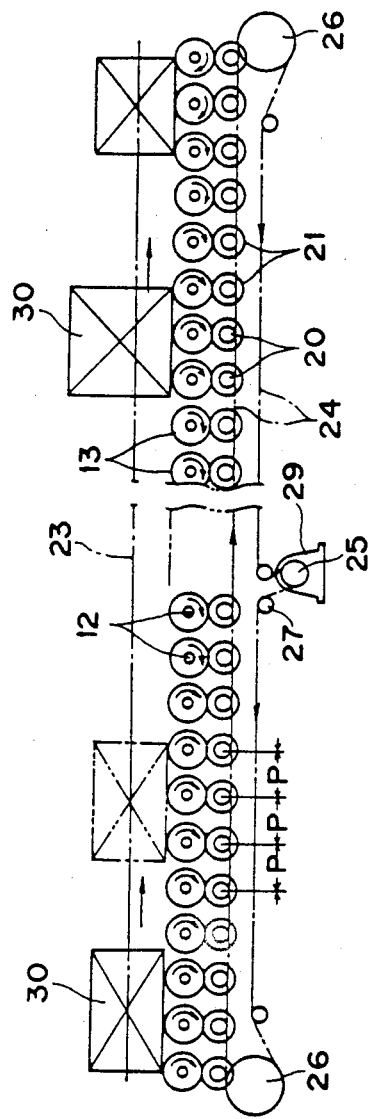
FIG. 6 is a diagrammatic side view of the entire roller conveyor shown in FIGS. 1 through 5.

FIGS. 1 and 6 show the operating state with the roller pitch P adjusted to a minimum. The chain 24 is constantly driven by the motor 29, so that all the sprockets 20 engaging the chain 24 are rotating around the axes of the support shafts 18. Further, each transmission roller 21 is contacted with the lower region of the outer periphery of the free roller 13 by the resilient force of the coil spring 37; thus, the group of free rollers 13 are forced to rotate, so that objects 30 can be transferred along the transfer path 23. When an object 30 is stopped by a stopper device (not shown), since the friction transfer force of the free roller 13 on the object 30 is greater than the friction force of the friction transfer section 22, the boss of the sprocket 20 slidingly rotates with respect to the inner wheel 21a. Thus, while the sprocket 20 is constantly rotating, the rotation of the free roller 13 is stopped, so that the object 30 can be stored without causing a sliding contact state on the lower side.

Figure 7:
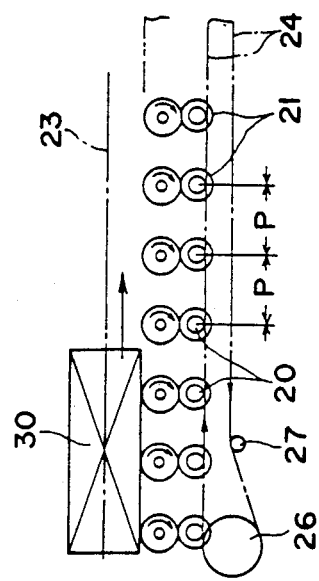
FIG. 7 is a fragmentary diagrammatic side view showing that the roller pitch of the roller conveyor shown in FIG. 6 has been changed.
Figure 8:
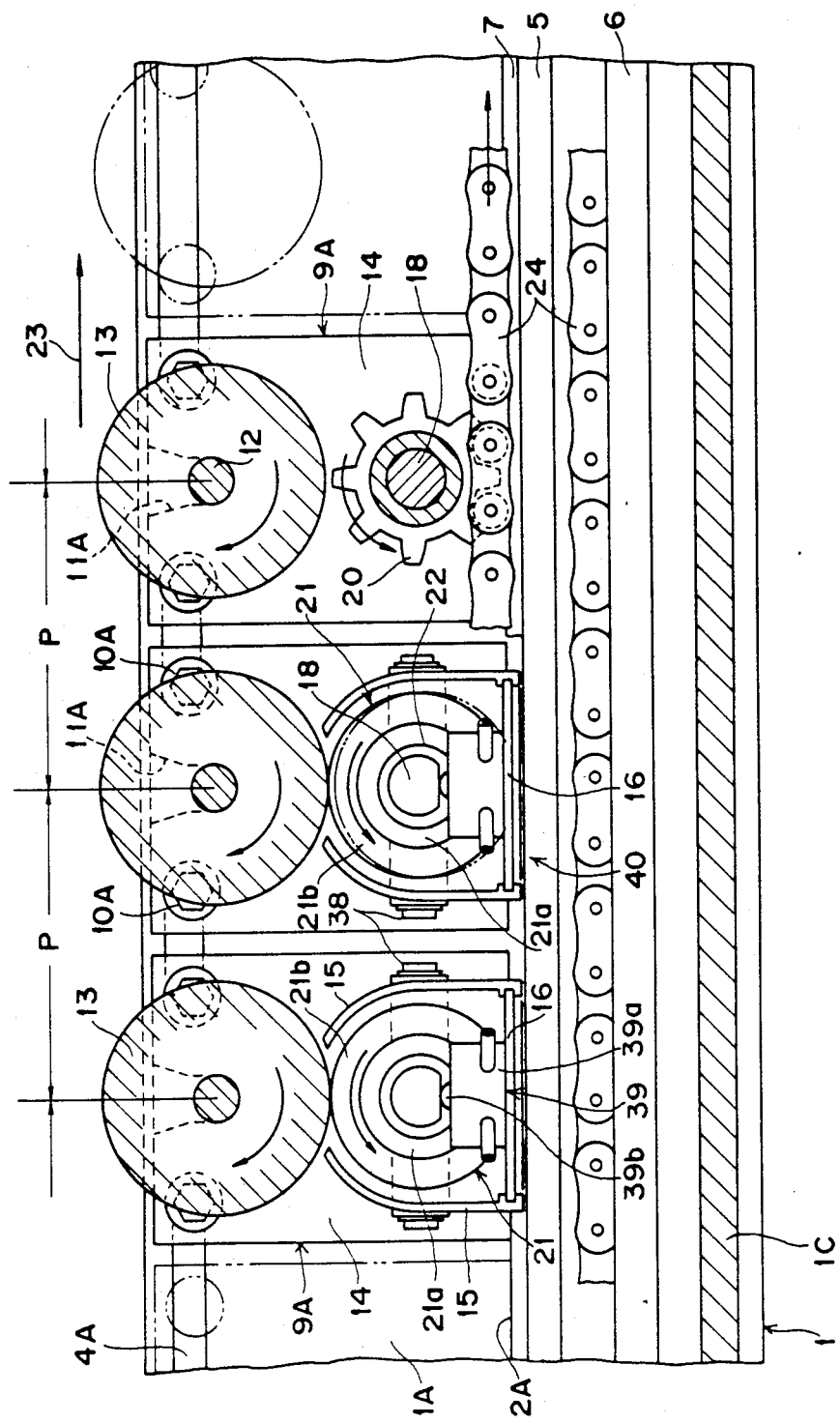
FIG. 8 is a sectional side view of a second embodiment of a roller conveyor.
Figure 9:
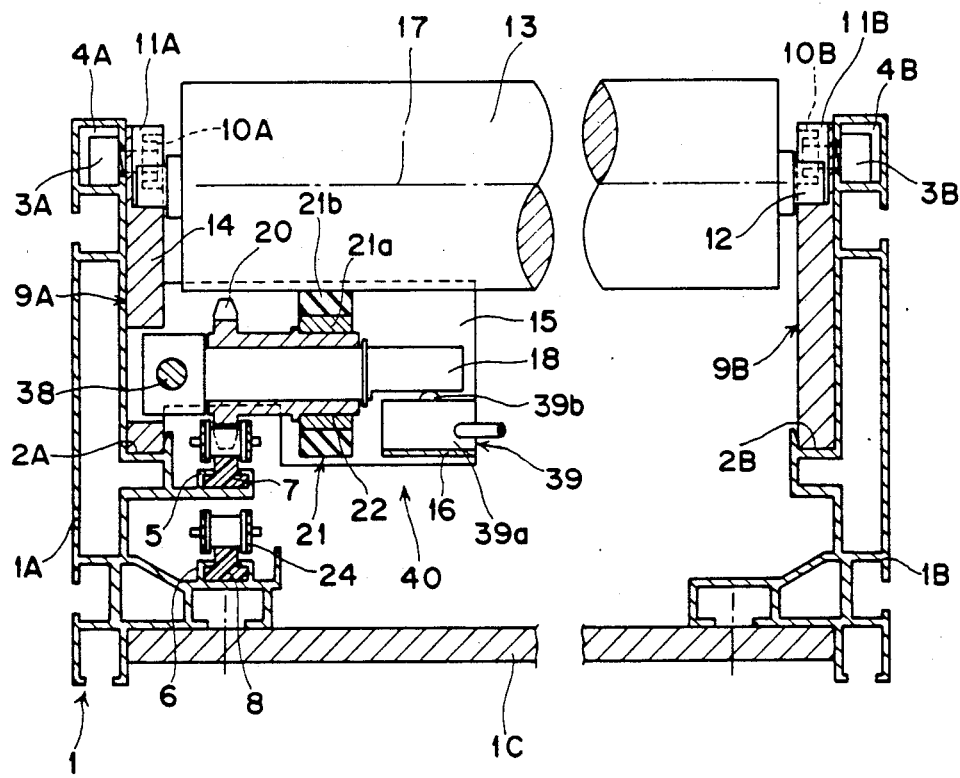
FIG. 9 is a sectional front view of the roller conveyor shown in FIG. 8.
Figure 10:
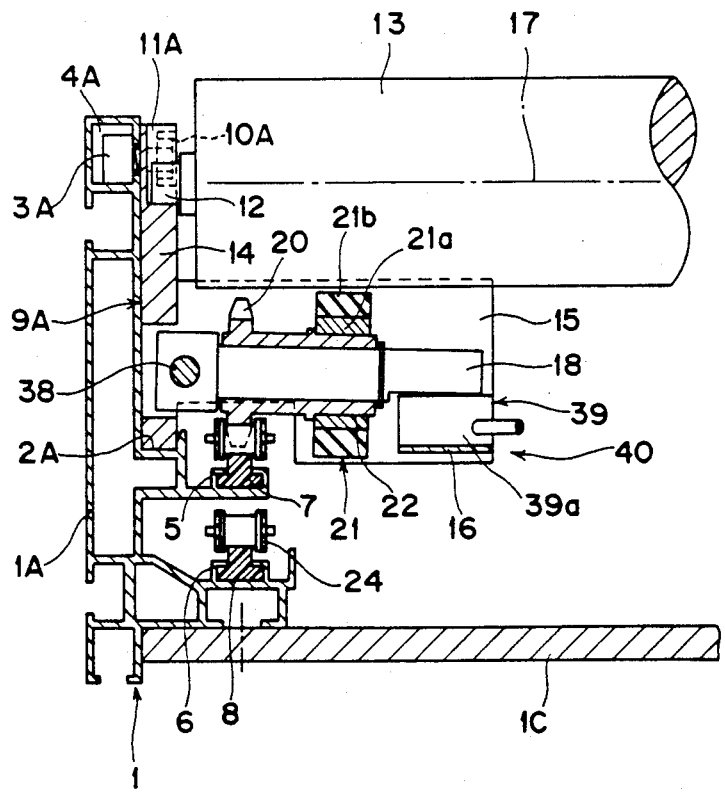
FIG. 10 is a sectional front view showing that a transmission roller in the roller conveyor shown in FIG. 9 has been separated from the free roller.

When the object 30 is a long-sized one as shown in FIG. 7, the roller pitch P can be increased to reduce the number of transmission units 40 consisting of free rollers 13 and transmission rollers 21. This can be attained by loosening the bolts 10A and 10B, moving the support frames 9A and 9B toward the transfer path 23 along the guides 2A and 2B, and tightening the bolts 10A and 10B with respect to the nuts 3A and 3B which have been moved integrally with the support frames 9A and 9B and bolts 10A and 10B. During this, excess free rollers 12 and support frames 9A and 9B are removed.

FIGS. 8 through 11 show a second embodiment of the invention. In the second embodiment, rotatably attached to the two cover plates 15 at a position closer to the base plate 14 is a shaft 38 extending in the direction of transfer at right angles with the roller axis 17. A cylinder device 39, which is another example of an upward movement imparting device, is installed between one end of the support shaft 18 and the connecting plate 16. In this case, the cylinder device 39 has a main body 39a fixed to the connecting plate 16 and a rod 39b contacted at its front end with the support shaft 38.

Figure 11:
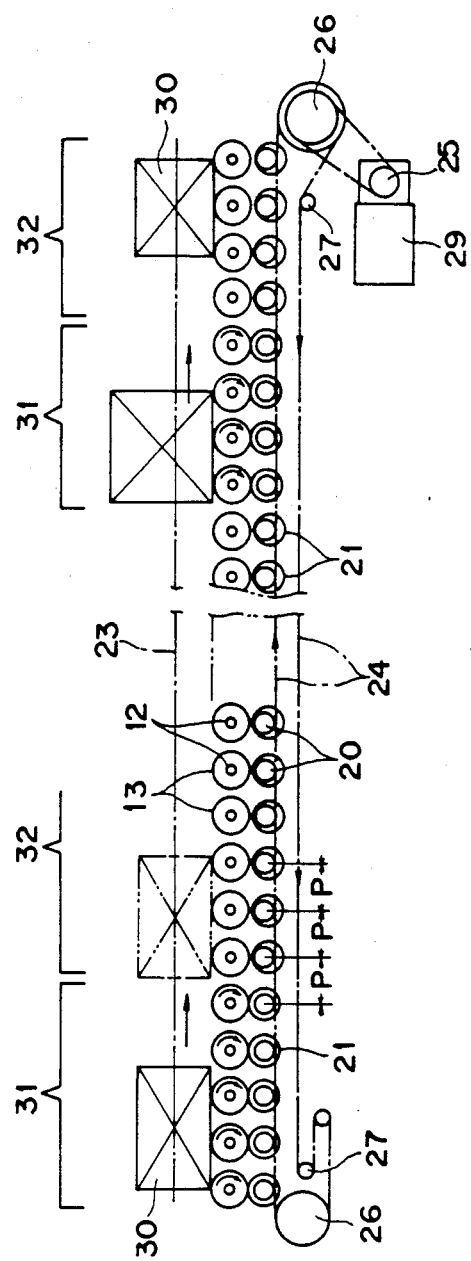
FIG. 11 is a diagrammatic side view of the roller conveyor shown in FIGS. 8 through 10.
Figure 12:
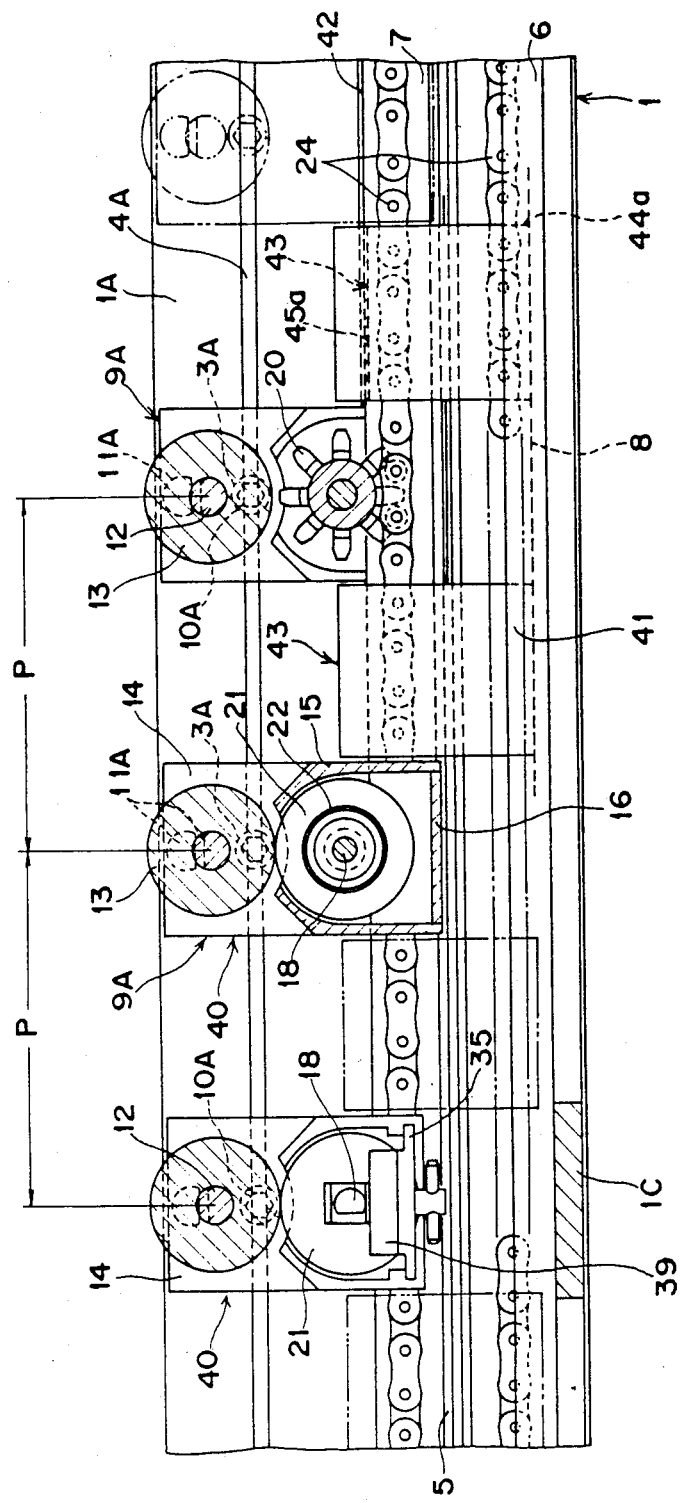
FIG. 12 is a sectional side view of a third embodiment of a roller conveyor according to the invention.
Figure 13:
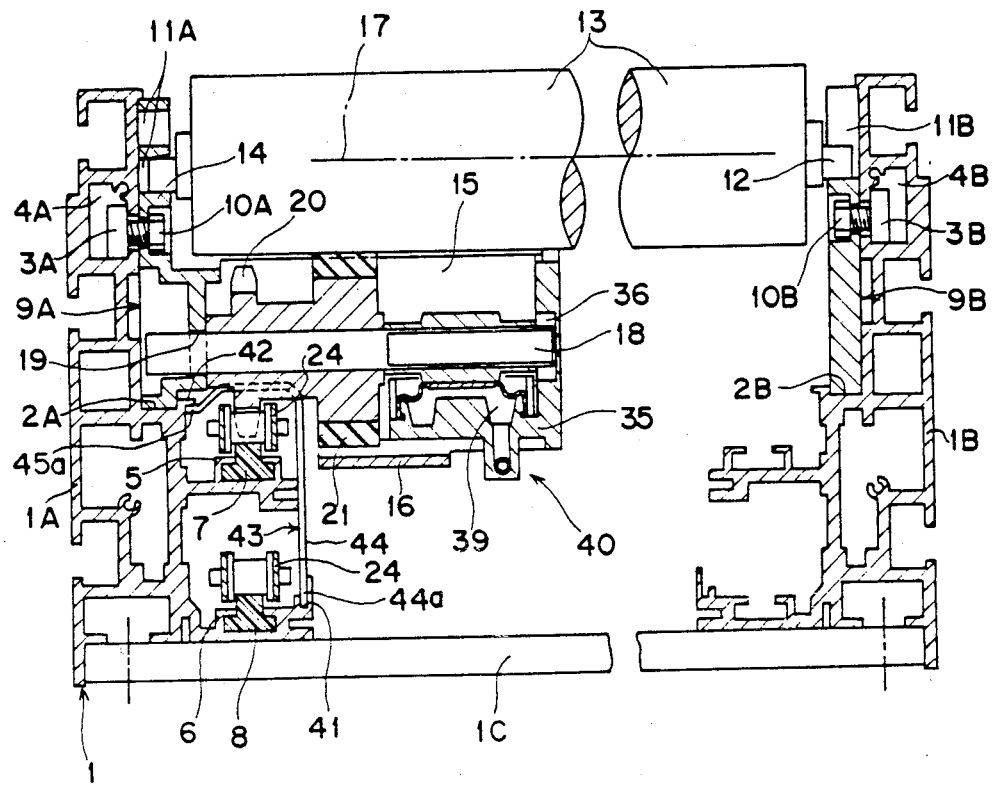
FIG. 13 is a sectional front view of the roller conveyor shown in FIG. 12
Figure 14:
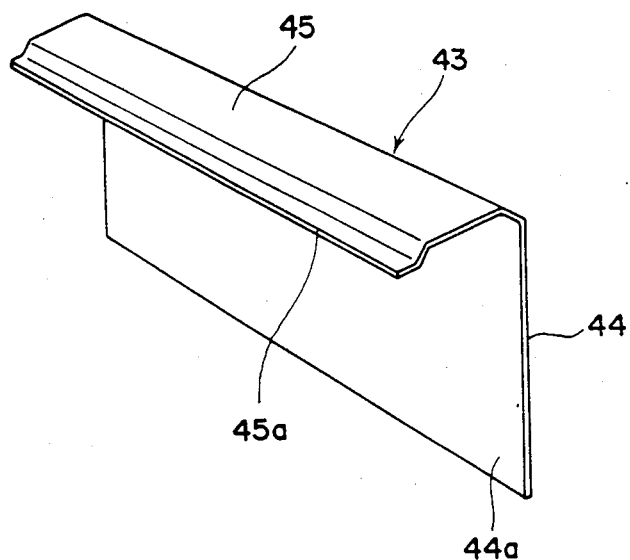
FIG. 14 is a perspective view of a cover used in the roller conveyor shown in FIGS. 12 and 13.

According to this second embodiment, the cylinder device 39 upwardly moves the transmission roller 21 together with the support shaft 18 and presses the transmission roller 21 against the free roller 13, whereby a group of free rollers 13 are forcibly rotated, as in a driving region 31 shown in FIG. 11, to transfer objects 31 along the transfer path 23. Further, the cylinder device 39 is reversely operated to lower the transmission roller 21 until the latter is separated from the free roller 13, whereby tranmission from the transmission roller 21 to the free roller 13 is interrupted. Thus, the rotation of the group of free rollers 13 is stopped, as in a non-driving region 32 shown in FIG. 11, to store the object 30 on the transfer path 23.

At this time, in the driving region 31, the object 30 is sensed by a sensing lever or phototube device and the free rollers 13 located forwardly of the object 30 in the direction of transfer are successively rotated, while the free rollers 13 passed over by the object 30 are successively stopped; by so controlling, the object 30 can be progressively displaced in the direction of transfer. In a particular location, a non-driving region 32 can be defined by a control signal so as to store the object 30. Further, the driving region 31 can be automatically controlled to be converted into a non-driving region 32 when the subsequent object 30 approaches the preceding object 30; thus, continuous storage can be effected without collision.

FIGS. 12 through 16 show a third embodiment of the invention.

The lateral frames 1A and 1B are obtained by extrusion of aluminum. At this time, simultaneously with the formation of the guides 2A and 2B and grooves 4A and 4B, the inner side of the lower attachment 6 is formed with a top-opened holding groove 41 extending throughout the region lengthwise of the transfer path 23, and a locking piece 42 inwardly projecting above the upper attachment 5 is formed throughout the region lengthwise of the transfer path 23. A cover 43 which covers the top and inner side of the path of transfer of the chain 24 is provided between adjacent transmission units 40. The cover 43 is an aluminum extruded article of substantially L-shaped cross section, and is cut into required lengths in use. The lower end of the vertical plate portion 44 of the cover 43 forms an insert portion 44a to be inserted from above into the holding groove 41, while the front end of the transverse plate portion 45 thereof forms a locking portion 45a to be locked from below to the locking piece 42. The cover 43 can be attached between tranmission units 40 by inserting the insert portion 44a from above into the holding groove 41 and locking the locking portion 45a to the lower locking piece 42 by utilizing the elasticity of the cover 43.

The shaft 18 has one end pivoted in bearing 19, permitting vertical swinging of the shaft. The opposite end of shaft 18 is capable of vertical movement in a vertically elongated opening 36 of plate 35. Cylinder device 39 moves the shaft upwardly causing transmission roller 21 to engage free roller 13, and downwardly to separate the transmission roller 21 from free roller 13.

During transfer operation, foreign substances from the object 30 will drop into a space between adjacent free rollers 13. Those foreign substances which fall onto a free roller 13 will slide down the free roller 13 to fall into a space between adjacent free rollers 13. Therefore, the transmission unit 40 consisting of the sprocket 20 and transmission roller 21, and the chain 24 located therebelow are protected from the foreign substances by the free rollers 13 and cover plates 15 which are connected by plate 16. All the foreign substances will drop from a space between free rollers 13, as described above, but since the chain 25 located between and below the free rollers 13 is covered with the lateral frame 1A and cover 43, they will never drop onto such parts.

Further, the provision of the covers prevents an operator who performs conveyor operation from accidentally putting his hand into the operating section of the chain 24. Thus, safety is secured.

Figure 16:
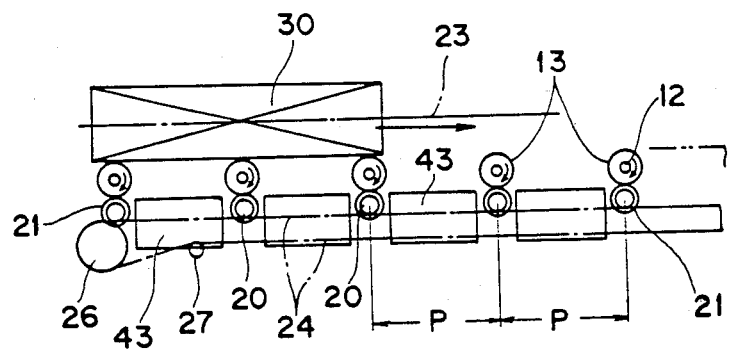
FIG. 16 is a fragmentary diagrammatic side view showing that the roller pitch of the roller conveyor shown in FIG. 15 has been changed
Figure 15:
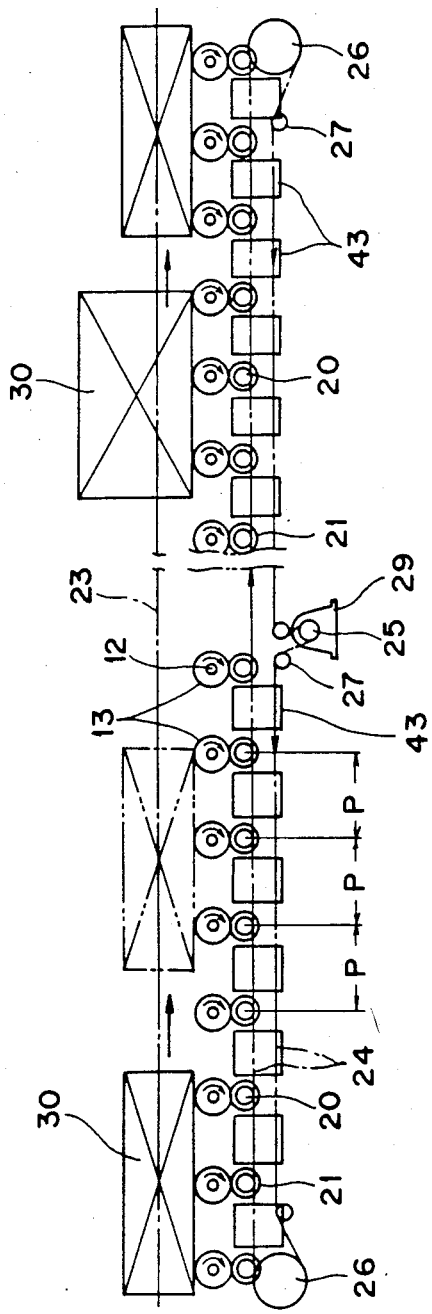
FIG. 15 is a diagrammatic side view of the entire roller conveyor shown in FIGS. 12 through 14.

When a long-sized object shown in FIG. 16 is handled as an object 30 to be transferred, the pitch P is increased and long-sized covers 43 corresponding to the changed pitch P are utilized.

In the above embodiment, the covers 43 have been of the type adapted to be removed from the lateral frames 1A and 1B. However, they may be of the type adapted to be removed from the tranmission units 40.

Figure 19:
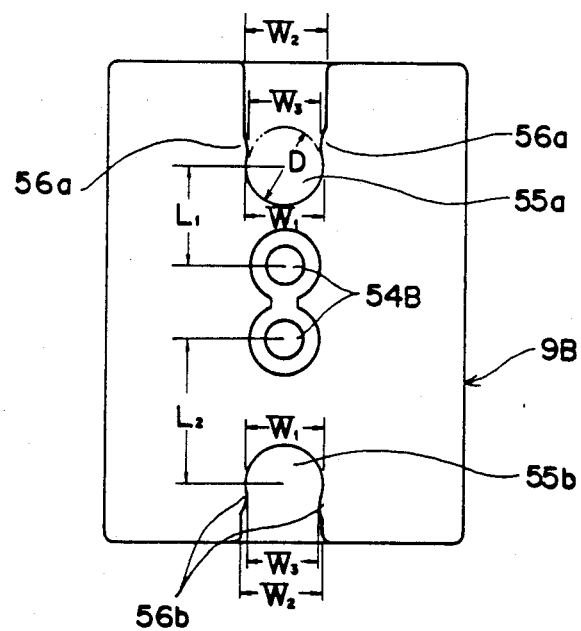
FIG. 19 is a view showing the other support frame used in the roller conveyor shown in FIGS. 17 and 18.

FIGS. 17 through 19 shows a fourth embodiment of the invention.

The base plate 14 of one support frame 9A is formed with locking holes 53a and 53b. The other support frame 9B is in the form of a rectangular plate having a pair of upper and lower attaching holes 54B for receiving a bolt 10B. Opposite sides of the support frame 9B with the attaching holes 54B interposed therebetween are formed with locking grooves 55a and 55b which are opened at end surfaces of the support frame 9B. The distances $L_1$ and $L_2$ from the bottoms of the locking grooves 55a and 55b to the attaching holes 54B are made equal to the distances $L_1$ and $L_2$ from the attaching hole 54A, formed in one support frame 9A to receive the bolt 10A, to the locking holes 53a and 53b. The free roller 13 has its roller shaft 12 inserted at one end thereof in either of the locking holes 53a and 53b and at the other end thereof in either of the locking grooves 55a and 55b from above and supported on the bottom of the groove.

The width dimensions of the locking grooves 55a and 55b are such that the innermost width $W_1$ (arc diameter) is somewhat greater than the diameter D of the roller shaft 12 and the inlet width $W_2$ is further greater than said dimater D, and projections 56a and 56b are formed between these regions, the width $W_3$ between these projections 56a and 56b being somewhat smaller than said diameter: $W_2 > W_1 > D > W_3$. Thus, the shaft 12 dropped into the locking groove 55a or 55b passes over the projections 56a or 56b by depressing them, so that during normal operation the projections 56a or 56b serve as stoppers which prevent upward withdrawal.

When free rollers of different diameter is used because of changes of the transfer speed or roller pitch P, the free rollers 13 now in use will be first removed. At this time, the operator raises the end of the free roller 13 associated with the support frame 9B, forcibly moving the end of the roller shaft 12 through the space between the projections 56a and 56b until it is upwardly removed from the locking groove 55a or 55b. Then the operator pulls the free roller 13 lengthwise of the latter to extract the other end of the roller shaft 12 from the locking hole 53a or 53b. And he resets the support frame 9A by turning it upside down. Subsequently, he inserts one end of the roller shaft 12 of a new free roller 13 into the locking hole 53b or 53a and the other end into the locking groove 55b or 55a. In this manner, the free roller 13 can be easily and quickly changed. The transmission roller is moved into contact with the free roller by upward pressure of spring 37 on shaft 18, in the manner previously described in connection with the first embodiment.

What is claimed is:

1. A roller conveyor comprising:
   a main frame,
   a plurality of movable support frame means attached to said main frame so that each support frame means position lengthwise of said main frame can be changed as desired,
   free rollers rotatably attached to the top of said support frame means for transferring objects to be transferred,
   support shafts disposed in the lower region of said support frame means and extending parallel to and below the axes of said free rollers, said support shafts being vertically swingably attached to said support frame means,
   a transmission roller and a driven wheel which are supported on each said support shaft and rotatable as a unit,
   upward movement imparting means attached to said support frame means and operatively connected to said support shafts to move the latter upward, thereby pressing said transmission rollers against the lower regions of the outer peripheries of said free rollers,
   driving means associated with said main frame and operatively connected to said driven wheels to drive the latter.

2. A roller conveyor as set forth in claim 1, wherein the driving means is an endless chain.

3. A roller conveyor as set forth in claim 1, wherein the upward movement imparting means is a spring.

4. A roller conveyor as set forth in claim 1, wherein the upward movement imparting means is a cylinder, which is operated to contact the transmission roller with the lower region of the outer periphery of the free roller or separate it therefrom.

5. A roller conveyor as set forth in claim 4, including a driving region in which the transmission roller is in contact with the free roller and a non-driving region in which the transmission roller is out of contact with the free roller, said regions being arranged lengthwise of the free roller.

6. A roller conveyor as set forth in claim 2, wherein the support frame means, support shaft, transmission roller, driven wheel and upward movement imparting means form a transmission unit, a plurality of such transmission units being arranged in spaced relationship with each other lengthwise of the main frame, with a cover for the chain being removably installed between adjacent transmission units.

7. A roller conveyor as set forth in claim 1, wherein each support frame means comprises a first support frame associated with one end of the shaft of the free roller associated with the transmission roller and a second support frame, separate from said first support frame, for supporting the other end of the shaft of the free roller remote from the transmission roller, said first support frame having a plurality of vertically spaced locking holes which, when the diameter of the shaft of the free roller is changed, is capable of supporting one end of the shaft of a new free roller at a different level corresponding to the change in the diameter of the shaft, said second support frame being adapted to be attached to the main frame in a plurality of directions, said second support frame having a plurality of locking grooves associated with the direction of attachment for supporting the other end of the shaft of said free roller, said locking grooves being arranged so that their groove bottoms for supporting the other end of the shaft of said free rollers are associated with the levels of said locking holes, said locking grooves each having projection means which serves as a stopper to prevent the other end of the shaft of the free roller from slipping off.

8. A roller conveyor as set forth in claim 2, wherein the chain is supported by chain support means integral with the main frame, and a guide rail fitted in said chain support means.

* * * * *